United States Patent [19]
Coltrinari

[11] 4,051,220
[45] Sept. 27, 1977

[54] SODIUM SULFIDE LEACH PROCESS

[75] Inventor: Enzo L. Coltrinari, Arvada, Colo.

[73] Assignee: Equity Mining Corporation, Vancouver, Canada

[21] Appl. No.: 662,583

[22] Filed: Mar. 1, 1976

[51] Int. Cl.$^2$ .......................... C01G 7/00; C01G 57/00
[52] U.S. Cl. ........................................ 423/24; 423/27; 423/87; 423/511
[58] Field of Search ............... 423/24, 37, 87, 511, 423/561, 27; 75/101 BE, 101 R, 118

[56] References Cited

U.S. PATENT DOCUMENTS

| | | | |
|---|---|---|---|
| 278,816 | 6/1883 | Parsons | 423/87 |
| 702,153 | 6/1902 | Van der Ploeg | 423/87 |
| 3,682,589 | 8/1972 | Moore | 423/24 |
| 3,911,078 | 10/1975 | Nadkarni | 423/87 |

OTHER PUBLICATIONS

Remy, *Treatise on Inorganic Chemistry*, vol. I, Elsevier Pub. Co., N. Y., 1956, pp. 659, 660.

*Primary Examiner*—O. R. Vertiz
*Assistant Examiner*—Brian Hearn

[57] ABSTRACT

A process is disclosed for treating mixed metal sulfides containing trivalent antimony sulfide wherein the sulfide concentrates are leached with an excess of sodium sulfide in order to isolate copper sulfide and other insolubles in solid form while solubilizing the remaining metal sulfides and producing sodium thioantimonite, separating the insoluble sulfides from the solution; oxidizing the sodium thioantimonite with elemental sulfur to produce sodium thioantimonate in solution; crystallizing a portion of the sodium thioantimonate along with other available metal sulfides from solution; and recirculating the remainder of the solution to the sodium sulfide leach stage. The crystallized metal sulfides may be further treated, isolated, and recovered as desired.

16 Claims, 1 Drawing Figure

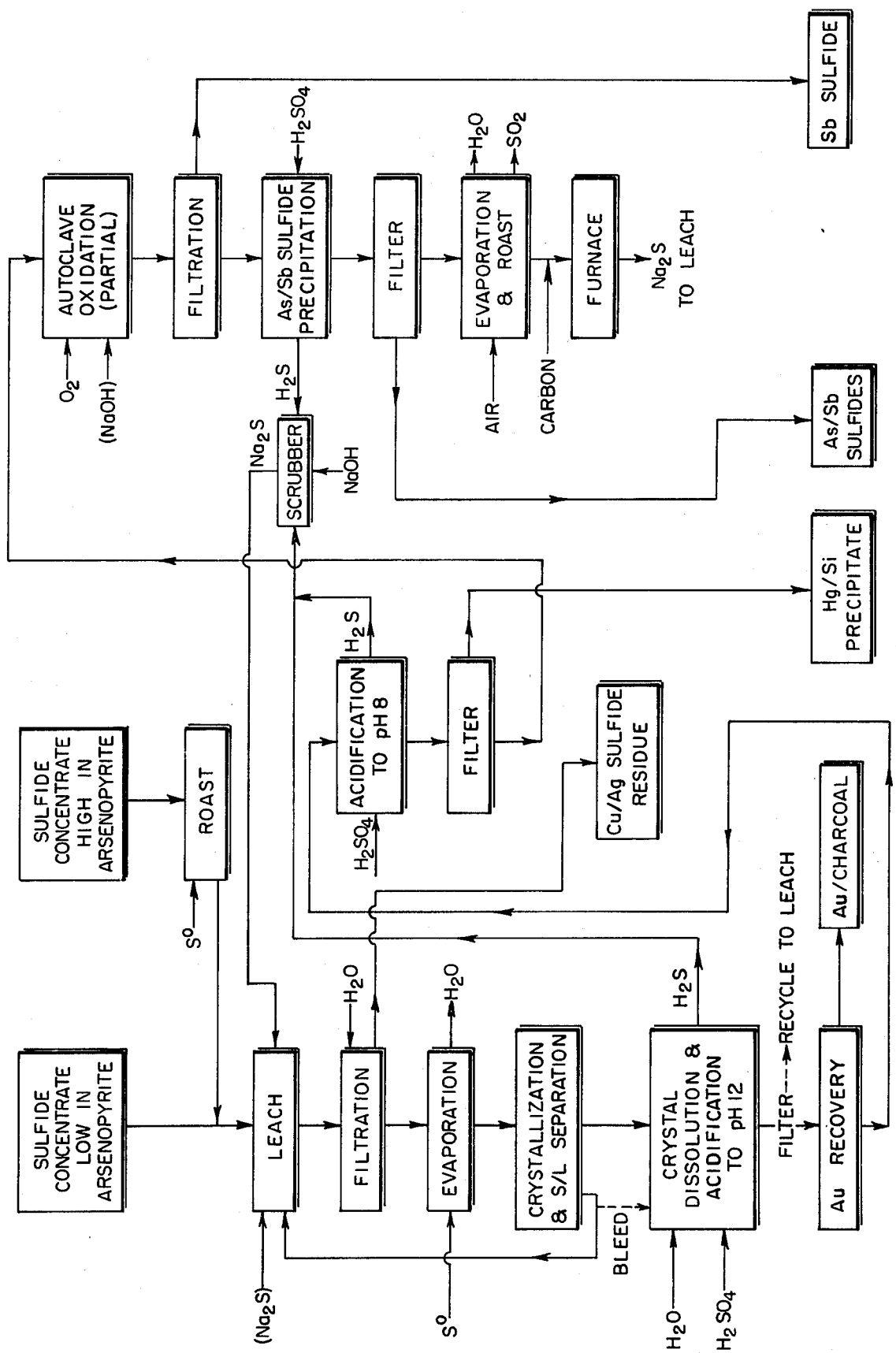

SODIUM SULFIDE LEACH PROCESS

BACKGROUND OF THE INVENTION

1. Field of the Invention

The process of the present invention relates generally to hydrometallurgical chemical leaching, as classified in Class 75, subclass 101R; and in one preferred embodiment relates to the treating of a mixture to obtain an antimony-containing compound as classified in Class 423, subclass 87.

2. The Prior Art

A number of sulfide mineral ore bodies exist which possess a considerable amount of antimony values. These antimony values may be existent in several forms, including tetrahedrite and stibnite. Often they exist in association with other mineral values, such as chalcopyrite. While no processes are known which deal directly with recovering antimony values from mixed metal sulfides, several are known for treating concentrates possessing relatively large amounts of arsenic values, including U.S. Pat. No. 3,709,680 to Holmes and Coltrinari, and U.S. Pat. No. 3,911,078 to Nadkarni et al. Holmes and Coltrinari disclose a process for removing arsenic from its ore concentrates by leaching the concentrates with an alkali metal sulfide to dissolve the arsenic values, precipitating the arsenic values from the solution by acidification, discarding the resultant arsenic values, and further treating the remaining solution in order to regenerate the alkali metal sulfide.

The Nadkarni reference discloses a process designed to remove essentially all of the arsenic from copper sulfide ores by leaching the concentrates with sodium sulfide in the presence of sodium hydroxide or other hydroxyl group in order to produce sodium thioarsenate and sodium thioantimonate. The arsenic values, along with any antimony present, are then crystallized from the solution and discarded, and the sodium sulfide/sodium hydroxide solution is then recirculated to the leaching step.

It is observed that the Nadkarni process is well suited for its purpose when dealing with sulfide ores containing arsenic in its pentavalent form. This highly oxidized form of arsenic produces sodium thioarsenate in accordance with the reactions presented in the reference, and this sodium thioarsenate may then be crystallized from solution. However, it has been observed that when antimony and arsenic are present in the initial concentrate in their trisulfide forms, the Nadkarni process is not as effective.

The process of the present invention separates antimony and arsenic from their concentrates, even when these values are in their trisulfide forms. Furthermore, in a preferred embodiment of the present process, a method is disclosed for the ultimate recovery of antimony.

SUMMARY OF THE INVENTION

A process is disclosed for treating metal sulfide ores and concentrates containing trivalent antimony sulfide comprising essentially the steps of leaching and concentrates with sodium sulfide in order to produce solid copper and other insoluble metal sulfides and a solution comprising sodium thioantimonite and the remaining metal sulfide values, separating the solid copper and other insolubles from the solution, oxidizing the sodium thioantimonite in solution to sodium thioantimonate, crystallizing a substantial portion of the sodium thioantimonate from solution, separating the crystallized values from the remaining solution, and recirculating the remaining solution to the sodium sulfide leach stage. When substantial portions of arsenopyrite are present in the initial concentrate, the concentrate is preferably roasted prior to the sodium sulfide leach stage. The crystals from the crystallization stage may be dissolved and further treated for recovery of the various metal values, including, for example, gold, mercury, and antimony.

BRIEF DESCRIPTION OF THE DRAWING

The FIGURE represents a process flow diagram incorporating the sodium sulfide leach and crystallization phase of the process, as well as the subsequent treating stages to recover gold, mercury and antimony.

DESCRIPTION OF THE PREFERRED EMBODIMENTS

The starting materials for this process include mineral sulfides with at least some trivalent antimony sulfide. The primary trivalent antimony sulfide minerals include tetrahedrite and stibnite. Examples of other mineral sulfides which may exist with the antimony sulfides include chalcopyrite, pyrite, sphalerite, galena, pyrrhotite, enargite, arsenopyrite, chalcocite, and other well-known metal sulfide values. The amount of antimony sulfide in the initial feed composition is not important, as long as that amount is sufficient for recovery in an economical fashion or to at least necessitate removal as an impurity during the recovery of one or more of the other metal values.

The mineral values are preferably concentrated and properly sized in order to facilitate the leaching process. The many techniques for accomplishing these procedures are, of course, well known in the art.

The leach phase of the process dissolves many of the mineral values, including the antimony sulfides, while leaving certain values, such as copper and silver, in solid sulfide form. This permits ready separation of the solids from solution, and these solid sulfide values may then be further processed as desired. Examples of metal sulfides which would not be dissolved by the sodium sulfide leach reaction of this process include copper sulfides, silver sulfides, zinc sulfides and lead sulfides.

The leaching phase is preferably conducted with a sodium sulfide solution in order to dissolve such metal sulfides as antimony, arsenic, mercury, and some of the gold. The leach is preferably conducted at a temperature of from about 60° C to about 150° C, more preferably from about 75° C to about slightly less than the boiling temperature of the solution, and most preferably from about 85° C to about 110° C. The reaction time is primarily a function of temperature, grind, and the amount of sodium sulfide present, and generally at a temperature of about 100° C and a substantial excess of sodium sulfide present, times from about 0.5 hours to about 24 hours are acceptable, with preferable times being from about 4 to 8 hours.

Other acceptable leaching agents include potassium sulfide, and when the antimony sulfide is primarily stibnite, ammonium sulfide. For simplicity of discussion, the sodium sulfide system will be described herein, but it is observed that similar values are also applicable to these other leaching agents.

The stoichiometric amount of sodium sulfide required to complete the leaching phase of the process is dependent upon the composition of the starting materials. A substantial excess of sodium sulfide is preferred in order to insure complete dissolution of the desired metal sulfides within a reasonable time. The sodium sulfide concentration introduced to the leach step is therefore preferably from about 50 to about 400, more preferably from about 150 to about 350, and most preferably from about 250 to about 300 grams per liter. As stibnite is relatively easily dissolved, a lower concentration is acceptable for its treatment.

The sodium sulfide leaching of antimony and arsenic sulfides is in accordance with the following reactions:

$$3Na_2S + Sb_2S_3 \text{ (Stibnite)} \rightarrow 2Na_3SbS_3 \quad (1)$$

$$3Na_2S + 4Cu_2S \cdot Sb_2S_3 \text{ (Tetrahedrite)} \rightarrow 4Cu_2S + 2Na_3SbS_3 \quad (2)$$

$$3Na_2S + As_2S_3 \text{ (Orpiment)} \rightarrow 2Na_3AsS_3 \quad (3)$$

$$3Na_2S + 3Cu_2S \cdot As_2S_5 \text{ (Enargite)} \rightarrow 3Cu_2S + 2Na_3AsS_4 \quad (4)$$

As equations (1) and (2) indicate, the soluble antimony products are sodium thioantimonite when the starting materials contain trivalent antimony sulfides. Also, as equation (3) indicates, when arsenic is present as a trivalent arsenic sulfide, the resulting product is sodium thioarsenite. Equation (4), on the other hand, discloses that sodium thioarsenate is produced when the starting material is in its pentavalent form, and this is in accordance with U.S. Pat. No. 3,911,078 to Nadkarni. The leach solution will also contain a substantial amount of sodium sulfide, due to the excess of this composition in the starting materials.

Following the leach reaction, it is important to convert the sodium thioantimonite to sodium thioantimonate by oxidatively reacting this composition with elemental sulfur. The immediate removal of the arsenic and antimony values from their leach solutions by means of crystallization is ineffective in the absence of this reaction, which proceeds as follows:

$$Na_3SbS_3 + S^o \rightarrow Na_3SbS_4$$

This reaction is preferably conducted within temperatures of from about 20° C to about 200° C, more preferably from about 50° C to about 100° C, and most preferably from about 60° C to about 80° C, with the reaction times being sufficient to convert substantially all of the sodium thioantimonite to sodium thioantimonate, which is preferably from about 0.1 to about 10, and more preferably from about 0.25 to about 0.5 hours.

Following this oxidation reaction, the antimony values are crystallized from solution.

Portions of other metal sulfides in solution will crystallize with the antimony values, including for example, mercury sulfides and sodium thioarsenate. Some gold may also crystalize. When trivalent arsenic sulfide is present in the feed material, the sodium sulfide leach reaction will convert this compound to sodium thioarsenite. The subsequent sulfur oxidation reaction oxidizes this value to sodium thioarsenate.

The crystallization technique may be in accordance with conventional methods, such as evaporation and refrigeration, as well as any suitable combination of known techniques. The solution is preferably cooled to at least about 40° C, more preferably to at least about 25° C, and most preferably to at least about 18° C. When a solution containing about 200 grams per liter sodium sulfide and 50 grams per liter antimony is cooled to about 18° C from about 50° C, generally about 85 percent of the sodium thioantimonate in solution is crystallized. Another preferable crystallization technique is vacuum evaporation, and of course this method does not require such cool temperatures.

Following the crystallization step, the solution comprises primarily sodium sulfide, with some residual metal sulfide values. This stream may then be recirculated, without the necessity of any additional processing, to the sodium sulfide leach step for the processing of additional feed materials.

Certain metal sulfides present in the feed material may necessitate initial processing prior to being introduced into the leach stage. An example of such a material is arsenopyrite, and when this mineral is present in a significant amount it is desirable to initially roast the concentrate in order to decompose the arsenopyrite. This decomposition reaction is believed to be as follows:

$$FeS_2 \cdot FeAs_2 + 4S \rightarrow 2FeS_2 + 2AsS$$

These products may then be treated by the sodium sulfide leach phase of the process. This roast may be conducted in a conventional manner, such as described in British patent specification No. 997,331, and within a temperature range of preferably from about 300° C to about 700° C, more preferably from about 400° C to about 600° C, and most preferably from about 480° C to about 520° C. At a temperature of about 500° C, the reaction time is generally within from about 0.5 to about 1.5 hours.

The crystals from the crystallization stage of the process may be further treated in order to recover any desired mineral values contained therein, as well as to regenerate any residual sodium sulfide. The crystals are preferably initially redissolved, and the solvent may consist of a number of alternatives, including a portion of the mother liquor sodium sulfide solution from the crystallization stage. Other suitable solvents include the antimony sulfide wash solution, when the antimony recovery step is employed with the process, as well as water and other downstream wash solutions.

When a significant amount of gold is in solution, this gold may be conveniently removed at this stage of the process. Various techniques may be employed, with one preferable and novel technique employing an ion exchange reaction. Suitable ion exchange agents include water insoluble quaternary amines of the following formula:

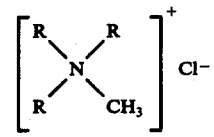

wherein R is a mixture of $C_8$ and $C_{10}$ carbon chains, with the $C_8$ predominating. One particularly preferable example of this ion exchange agent is a tricaprylyl monomethyl ammonium chloride, which compound is available from the General Mills corporation under the trade name "ALIQUAT 336."

This ion exchange agent is preferably loaded onto an activated carbon carrier and brought into contact with the gold-bearing stream in order to adsorb the gold.

The feed stream pH is preferably adjusted to about 12, which is conveniently accomplished by the addition of sulfuric acid. Based on the total weight of the Aliquat 336 and activated carbon, about 10 percent Aliquat 336 loaded onto about 90 percent by weight activated carbon and placed in a column yields about 0.3 percent by weight gold (based on the total weight of activated carbon, Aliquat 336, and gold) when the initial feed solution contains from about 2 to about 5 parts per million gold and is percolated through the column.

The temperature of this gold recovery process is preferably from about 10° C to about 60° C, and more preferably from about 20° C to about 35° C, with a solution retention time in contact with the activated carbon of from about 0.1 to about 30 minutes. The gold adsorbed onto the ion exchange agent may then be recovered in conventional fashion.

When mercury is present in the resulting solution, it, along with silica, may be recovered by adjusting the pH of the solution to about 8, which again may be accomplished by the addition of sulfuric acid.

Once the gold and mercury and other desired metal values are removed, the solution will generally comprise predominantly sodium thioarsenate and sodium thioantimonate. Under many conditions, it is desirable to separate the antimony sulfides from the remainder of the solution, as antimony has substantial commercial value.

A preferable and novel technique for recovering the antimony values from this resulting solution is by oxidizing the thioantimonate compounds in solution in order to selectively precipitate these values as antimony sulfides, thereby separating these antimony values from the arsenic values in solution. The thioantimonate compounds are reacted with oxygen in order to produce insoluble antimony sulfides and under some circumstances possibly minor amounts of sodium hydroxyantimonate and sulfur, along with soluble arsenic compounds, soluble sodium thiosulfate and possibly some other non-sulfate sodium salt. Hence, the primary reaction is believed to be:

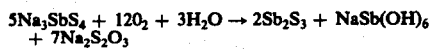

$$5Na_3SbS_4 + 12O_2 + 3H_2O \rightarrow 2Sb_2S_3 + NaSb(OH)_6 + 7Na_2S_2O_3$$

While these products are representative of the types known to be formed, the only product of primary importance is antimony sulfide. The arsenic values remain in solution, permitting the antimony sulfides to be recovered by filtering or other conventional separation techniques.

The concentration of the starting materials is not particularly important to effect the desired separation, although the process may be conducted more efficiently if the thioantimonate concentration in the starting solution is from about 20 to about 80 grams per liter, and preferably from about 40 to about 60 grams per liter. Also the concentration of thioarsenate is not important as the purity of the final antimony sulfide product may be controlled by recycling this product stream back to the oxidation step until the desired purity is attained. In order to obtain a final antimony sulfide product possessing less than about 0.4 percent arsenic and recovering 95 percent of the antimony in solution, the ratio of the thioantimonate concentration to thioarsenate concentration should be maintained at least at about two to one.

The amount of oxygen consumed during the reaction is critical to the antimony-arsenic separation. If insufficient oxygen is provided, the antimony recovery will be adversely affected. If too much oxygen is provided, all or part of the arsenic will also be oxidized, and the antimony-arsenic separation will not be accomplished. The preferred amount of oxygen consumed by the reaction when the reactants are thioantimonate and thioarsenate and there are no additional compounds competing for the oxygen is such that the final solution e.m.f. is preferably from about 300 to about 500, more preferably from about 350 to about 430, and most preferably from about 390 to about 410 millivolts, measured with Platinum/saturated Calomel electrodes. Based on this criteria, it is generally found that the amount of oxygen consumed per pound of antimony being treated is preferably from about 0.5 to about 1.5, more preferably from about 0.6 to about 0.9, and most preferably from about 0.75 to about 0.85 pounds.

It is also critical to the effective operation of the process that the pH be maintained within a range of about 7 to about 11, more preferably from about 7.5 to about 10, and most preferably from about 8 to about 9. If the pH is permitted to fall below the minimum values, precipitates other than antimony sulfides tend to be produced, detrimentally affecting the product purity. The solution pH may be maintained by adding, if necessary, any suitable base, such as sodium hydroxide.

The temperature and pressure of the reaction are not particularly important from the final product standpoint, but do affect the rate of reaction. The reaction does proceed at room temperature and atmospheric pressure, although the rate is quite slow. Therefore, the reaction temperature is preferably maintained from about 25° C to about 200° C, more preferably from about 50° C to about 150° C, and most preferably from about 90° C to about 120° C. The reaction pressure is preferably maintained at at least about atmospheric pressure, more preferably from about 20 to about 150, and most preferably from about 40 to about 80 psig.

The reaction time is very fast, and within the perferred temperature and pressure parameters set forth above, the reaction time is not a factor. Hence, the process may conveniently be conducted in either a batch or continuous fashion. It is generally preferred to agitate the solution during the reaction in order to keep the oxygen well dispersed.

As was previously mentioned, the antimony product stream may be redissolved and recycled in order to obtain an antimony sulfide product practically entirely free of arsenic impurity.

Upon completion of the reaction, the product stream is filtered in order to separate the antimony sulfide precipitate from the product solution. The antimony sulfide product is then of commercial value and may be sold at this point, or further conventionally treated to produce antimony oxide, elemental antimony, and other products. The product solution may be further treated for the production of any other values desired.

EXAMPLES

The following example illustrates the process of the present invention for a feed material comprising essentially about 35% chalcopyrite, 35% tetrahedrite, 10% pyrite, 5% sphalerite, 4% galena, 3% pyrrhotite, 2% arsenopyrite, minor amounts of other metal sulfide values including gold and mercury, with the remainder comprising gangue. This concentrate is treated in a process essentially comprising the process flow diagram presented in the figure, and due to the presence of a significant amount of gold, mercury, and antimony, the process flow diagram illustrates preferred techniques for recovering these values.

The process is operated in a continuous fashion with 70.7 pounds of feed introduced into the process per minute. The concentrate is initially roasted at a temperature of about 500° C in a neutral atmosphere for a residence time of approximately 1.5 hours with elemental sulfur being added at a rate of 50 pounds per ton of concentrate being treated. The initial feed concentrate contains approximately 2.04 pounds/minute arsenic, 4.56 pounds/minute antimony, and 0.021 ounces/minute of gold. During the roast, the arsenopyrite is converted to iron sulfide and arsenic sulfide, and about 90% of the mercury is removed in the roast off-gas stream.

The products from the roast are then introduced into the leach phase of the process and contacted with a recycled solution containing approximately 10 grams per liter antimony, 25 grams per liter arsenic, 276 grams per liter sodium sulfide, 5 parts per million gold, and about 0.1 grams per liter mercury. The leach reaction is conducted at about 102° C, resulting in a product analysis which indicates that essentially all of the copper and silver sulfides are left in the residue, along with most of the gold and minor amounts of arsenic, antimony, and mercury. This residue is separated from the solution, washed, and is available for further processing for the recovery of the various metal values contained therein as desired.

The products in solution as a result of the sodium sulfide leach reaction include sodium thioantimonite and sodium thioarsenite, along with some mercury and gold. This solution is contacted with elemental sulfur at a temperature of about 80° C in order to produce sodium thioantimonate and sodium thioarsenate. The temperature of the solution is reduced to about 18° C, resulting in the crystallization of about 4.23 pounds per minute antimony and 1.52 pounds per minute arsenic, and trace amounts of gold and mercury. The remaining solution is then recycled to the sodium sulfide leach stage, and the crystals are redissolved using approximately 5% of the recycle solution as a bleed stream and the antimony sulfide wash solution produced later in the process.

Upon redissolving the crystals, the pH of the solution is greater than 13, and sufficient 93% sulfuric acid is added to adjust the pH to about 12. Hydrogen sulfide is recovered as a result of this pH adjustment, as well as a minor amount of precipitate containing arsenic and antimony sulfides. The solution is then contacted with 48.4 pounds per day of Aliquat 336, a General Mills product comprising tricaprylyl monomethyl ammonium chloride of the formula hereinabove presented, loaded on activated carbon. The Aliquat 336/activated carbon agent is arranged in a column, and the solution is percolated through the column. Substantially all of the gold and some mercury are adsorbed onto this Aliquat 336 surface. The temperature of this ion exchange reaction is maintained at about 25° C.

The solution is then treated for mercury removal by adjusting the pH to about 8, again using 93% sulfuric acid at a temperature of about 25° C. This recovers essentially all of the mercury and silica, while precipitating very minor amounts of antimony and arsenic.

The solution, now essentially comprising sodium thioantimonate and sodium thioarsenate, is treated with sufficient sodium hydroxide to adjust the pH to about 12 and introduced into an autoclave. About 3.3 pounds per minute of oxygen is injected and the system is maintained at about 115° C and well agitated in order to oxidize 4.40 pounds per minute of antimony as antimony sulfide. This antimony sulfide precipitates from solution with only a very minor amount of arsenic and is then separated from solution. This antimony sulfide is recovered, and may be further processed as desired. The remainder of the solution is treated with sulfuric acid in order to precipitate the remaining antimony and all of the arsenic in their sulfide forms, which are then discarded. This acidified solution is then evaporated to remove the water, and the remaining sodium salts are roasted at about 650° C for approximately 1 hour to produce sodium sulfate. This sodium sulfate is then reduced with coke to produce an off-gas stream of carbon dioxide and carbon monoxide and to convert the sodium sulfate to sodium sulfide. The sodium sulfide may then be recirculated to the sodium sulfide leaching stage.

EXAMPLE 2

A feed material comprising essentially about 35% chalcopyrite, 35% tetrahedrite, 10% pyrite, 5% sphalerite, 4% galena, 3% pyrrhotite and minor amounts of other metal sulfide values was leached with a sodium sulfide solution having a sodium sulfide concentration of about 265 grams per liter, resulting in a solution possessing 159 grams of antimony in the form of sodium thioantimonite. The solution was subjected to evaporation and then cooled to about 20° C, and agitated at this temperature for 1 hour. The product analysis indicated 126 grams of antimony remained in the mother liquor, while 33 grams or 20.7 percent of the antimony was crystallized.

A 300 ml. sample of this remaining mother liquor, having an antimony concentration of 71 grams per liter, with the total amount of antimony being 21.2 grams, was then contacted with elemental sulfur and agitated for 1 hour at a temperature of 95° C, and the resulting product solution was then cooled to about 20° C and agitated for 1 hour. The resulting product analysis indicated that 18.5 grams of antimony were present in the crystals, while only 2.7 grams of antimony remained in the mother liquor, providing an antimony crystallization of 87%.

The comparative tests of Example 2 therefore clearly indicate the substantial increase in antimony crystallization recovery as a result of converting the sodium thioantimonite to sodium thioantimonate prior to the crystallization.

What is claimed is:
1. A process for treating metal sulfides in the presence of antimony sulfide comprising:
 a. leaching the metal sulfides with sodium sulfide in order to produce a residue containing insoluble sulfides and a solution comprising sodium thioantimonite and the remaining metal sulfide values;
 b. separating the insoluble metal sulfides from the solution;
 c. oxidizing the sodium thioantimonite in solution to sodium thioantimonate;
 d. crystallizing a portion of the sodium thioantimonate from the solution; and
 e. separating the crystallized sodium thioantimonate from the solution.
2. The process of claim 1 wherein the metal sulfides being treated include chalcopyrite.

3. The process of claim 1 wherein the antimony sulfide comprises one or more members selected from the group consisting of tetrahedrite and stibnite.

4. The process of claim 1 wherein the metal sulfides being treated include arsenopyrite.

5. The process of claim 4 wherein the metal sulfides being treated are initially roasted within a temperature of from about 400° C to about 600° C.

6. The process of claim 1 wherein the metal sulfides being treated include gold.

7. The process of claim 6 comprising:
a. redissolving the crystallized sodium thioantimonate;
b. adjusting the pH of the solution resulting from the redissolving of the crystals to about 12;
c. contacting the redissolved sodium thioantimonate solution with an ion exchange agent loaded onto an activated carbon surface, the ion exchange agent comprising:

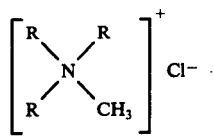

wherein R is a mixture of $C_8$ and $C_{10}$ carbon chains, in order to remove substantially all of the gold from solution.

8. The process of claim 1 wherein the metal sulfides being treated include arsenic sulfides.

9. The process of claim 8 comprising:
a. redissolving the crystallized sodium thioantimonate to form a solution comprising sodium thioantimonate and sodium thioarsenate;
b. subjecting the sodium thioantimonate/sodium thioarsenate solution to partial oxidation by injecting sufficient oxygen so as to maintain a final solution e.m.f. of from about 300 millivolts to about 500 millivolts, measured with Platinum/saturated Calomel electrodes while maintaining the product solution at a pH of from about 7 to about 11 in order to oxidize and precipitate a substantial portion of the sodium thioantimonate as antimony sulfide while leaving substantially all of the sodium thioarsenate in solution.

10. A process for treating metal sulfides including gold in the presence of antimony sulfide comprising:
a. leaching the metal sulfides with sodium sulfide in order to produce a residue containing insoluble sulfides and a solution comprising sodium thioantimonite and the remaining metal sulfide values;
b. separating the insoluble metal sulfides from the solution;
c. oxidizing the sodium thioantimonite in solution to sodium thioantimonate;
d. crystallizing a portion of the sodium thioantimonate from the solution;
e. separating the crystallized sodium thioantimonate from the solution;
f. redissolving the crystallized sodium thioantimonate;
g. adjusting the pH of the solution resulting from the redissolving of the crystals to about 12;
h. contacting the redissolved sodium thioantimonate solution with an ion exchange agent loaded onto an activated carbon surface, the ion exchange agent comprising:

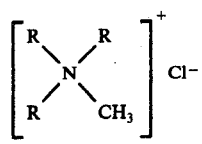

wherein R is a mixture of $C_8$ and $C_{10}$ carbon chains, in order to remove substantially all of the gold from solution.

11. A process for treating metal sulfides including arsenic sulfides in the presence of antimony sulfide comprising:
a. leaching the metal sulfides with sodium sulfide in order to produce a residue containing insoluble sulfides and a solution comprising sodium thioantimonite and the remaining metal sulfide values;
b. separating the insoluble metal sulfides from the solution;
c. oxidizing the sodium thioantimonite in solution to sodium thioantimonate;
d. crystallizing a portion of the sodium thioantimonate from the solution;
e. separating the crystallized sodium thioantimonate from the solution;
f. redissolving the crystallized sodium thioantimonate to form a solution comprising sodium thioantimonate and sodium thioarsenate;
g. subjecting the sodium thioantimonate/sodium thioarsenate solution to partial oxidation by injecting sufficient oxygen so as to maintain a final solution e.m.f. of from about 300 millivolts to about 500 millivolts, measured with platinum/saturated Calomel electrodes while maintaining the product solution at a pH of from about 7 to about 11 in order to oxidize and precipitate a substantial portion of the sodium thioantimonate as antimony sulfide while leaving substantially all of the sodium thioarsenate in solution.

12. A process for treating metal sulfides in the presence of antimony sulfide comprising:
a. leaching the metal sulfides with sodium sulfide in order to produce a residue containing insoluble sulfides and a solution comprising sodium thioantimonite and the remaining metal sulfide values;
b. separating the insoluble metal sulfides from the solution;
c. oxidizing the sodium thioantimonite with elemental sulfur in solution to produce sodium thioantimonate;
d. crystallizing a portion of the sodium thioantimonate from the solution; and
e. separating the crystallized sodium thioantimonate from the solution.

13. The process of claim 12 wherein the reaction is conducted within a temperature range of from about 20° C to about 200° C.

14. The process of claim 12 wherein the reaction is conducted within a temperature range of from about 50° C to about 100° C.

15. The process of claim 12 wherein the reaction is conducted for a period of time of between about 0.1 and about 10 hours.

16. The process of claim 12 wherein the reaction is conducted for a period of time of between about 0.25 and about 0.5 hours.

* * * * *

UNITED STATES PATENT OFFICE
CERTIFICATE OF CORRECTION

Patent No. 4,051,220            Dated September 27, 1977

Inventor(s)    Enzo L. Coltrinari

It is certified that error appears in the above-identified patent and that said Letters Patent are hereby corrected as shown below:

On the second page in Column 1 under Summary of the Invention at line 61 reading "comprising essentially the steps of leaching and concentrates", should read-- "comprising essentially the steps of leaching the concentrates"--

Signed and Sealed this

Seventeenth Day of January 1978

[SEAL]

Attest:

RUTH C. MASON          LUTRELLE F. PARKER
Attesting Officer      Acting Commissioner of Patents and Trademarks